Feb. 13, 1923.
O. MULLER, JR.
WELDING JIG.
FILED SEPT. 19, 1919.
1,445,231.
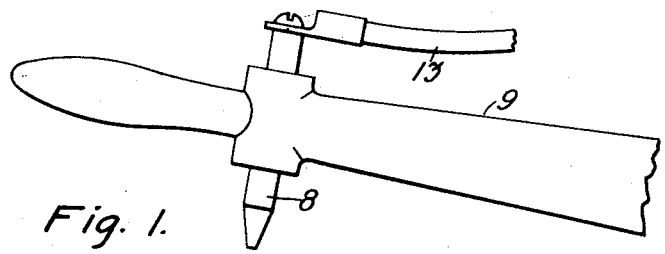
Fig. 1.
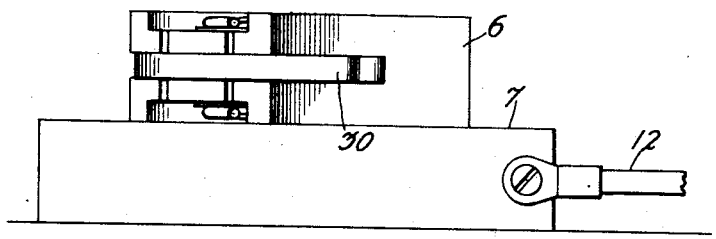
Fig. 2.
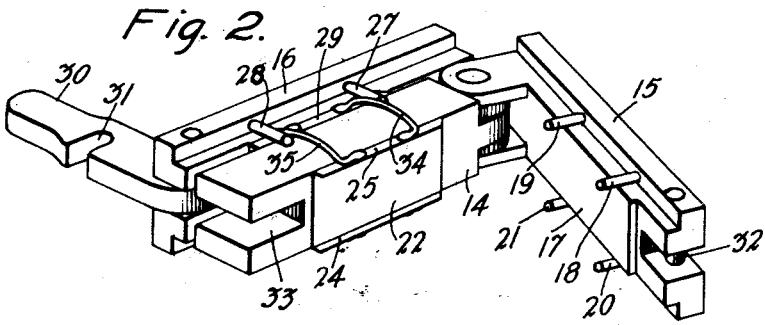
Fig. 4.
Fig. 3.
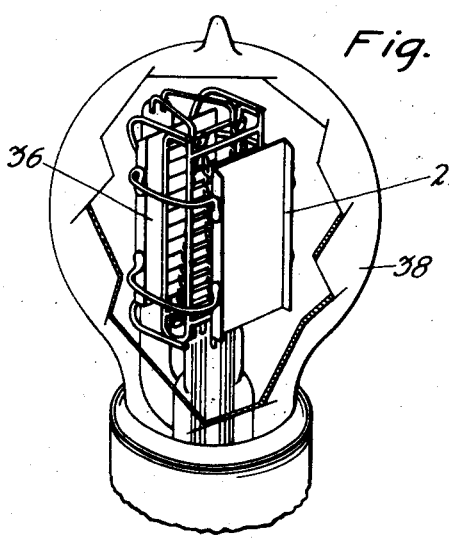
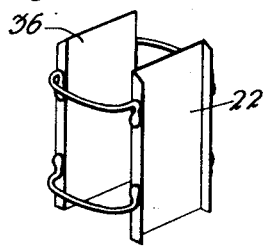
Inventor:
Otto Muller, Jr.
By
Att'y.

Patented Feb. 13, 1923.

1,445,231

UNITED STATES PATENT OFFICE.

OTTO MULLER, JR., OF RIDGEWOOD, NEW YORK, ASSIGNOR TO WESTERN ELECTRIC COMPANY, INCORPORATED, OF NEW YORK, N. Y., A CORPORATION OF NEW YORK.

WELDING JIG.

Application filed September 19, 1919. Serial No. 324,957.

*To all whom it may concern:*

Be it known that I, OTTO MULLER, JR., a citizen of the United States, residing at Ridgewood, in the county of Queens, State of New York, have invented certain new and useful Improvements in Welding Jigs, of which the following is a full, clear, concise, and exact description.

This invention relates to welding jigs, and more particularly it relates to welding jigs for vacuum tube electrodes.

In the manufacture of vacuum tubes, particularly of the type wherein a plurality of electrodes are employed, it is essential that the space relation of the electrodes be made the same in all tubes of a similar type in order that their operating characteristics will be identical.

In its specific aspect this invention is described in connection with a vacuum tube electrode that comprises two plates which are to be spaced with respect to each other by connecting wires of suitable length welded to each plate. In order that these plates may be spaced and aligned properly, they are placed in a welding jig while the connecting wires are being welded thereto. This jig comprises a block against two parallel sides of which the two plates may be placed. Hinged to one end of the block are two arms which are adapted to be clamped tightly against the block to hold the plates in place. It is preferable that the width of the surfaces of the sides against which the plates are pressed be the same as the width of the plates. Lugs may then be provided on the two arms projecting inwardly towards the block, spaced so as to just allow the block to pass between the lugs, thereby preventing any lateral motion of the two plates. It is also preferable that the jig be made of some conducting material, such as copper, so that the jig may be employed as a part of one of the electrodes of the welding machine. The jig with the two plates clamped in place may then be placed on the base plate which forms one of the electrodes of a welding machine and the above described connecting wires welded to the plates in any suitable manner.

This invention will be better understood by reference to the following detailed description taken in connection with the accompaying drawings, in which Fig. 1 shows the welding jig of this invention employed as part of an electrode of a welding machine; Fig. 2 illustrates in detail the welding jig of this invention; Fig. 3 shows the assembly of a two-plate electrode of a form adapted to be held during the welding process by the welding jig illustrated in Fig. 2; Fig. 4 shows such a double plate electrode incorporated as the anode of a vacuum tube of the three-electrode type.

Referring to Fig. 1, 6 is a metallic welding jig which is shown to be resting on the base plate 7 which together with the jig forms one of the electrodes of the welding machine. The other electrode 8 of the machine is attached to a movable arm 9 so that the electrode 8 may be placed in contact with the part to be welded on the article held by jig 6. Current for these electrodes may be supplied by means of leads 12 and 13.

The welding jig 6 is shown in detail in Fig. 2, in which 14 is a metallic block having two plane parallel sides of substantially the same width as the plates to be held by the jig and of a thickness equal to the distance desired between the two plates of the vacuum tube electrode. Hinged at the one end of block 14 are two arms 15 and 16. Arm 15 has a raised plane surface 17 of substantially the same width as the width of the plate to be held by the jig. Near the upper edge of arm 15 are two inwardly projecting lugs 18 and 19; near the lower edge are two corresponding inwardly projecting lugs 20 and 21. The distance between lugs 18, 19 and lugs 20, 21 should be just slightly greater than the width of plate 22, which is to be held between block 14 and the plane surface 17 of arm 15. The specific form of plate shown in Fig. 2 has upturned edges 24 and 25, which are adapted to fit snugly over the edges of the projecting surface 17 of arm 15.

Arm 16 is similar to arm 15 in that it has a raised plane surface corresponding to the surface 17 of arm 15 and has lugs in its upper and lower edges for preventing any lateral motion of the plate held between arm 16 and block 14. Only two of the lugs 27 and 28 are shown in the figure. 29 is one of the upturned edges of the plate which is held between arm 16 and block 14. With the two plates in position between the arms and the block, the arms may be clamped tightly against the plates by means of member 30 which has a slot 31 adapted to engage pinion 32 in arm 15. Block 14 is slotted at 33 to receive the member 30, thereby preventing any lateral motion of block 14 between the arms 15 and 16. The connecting wires 34 and 35, which are employed to make a unitary structure of the plates 22 and 36, may then be put in position with their ends resting on the upturned edges of the two plates. For convenience, it is preferable that the width of plates 15 and 16 be greater than the width of block 14 so that when the jig is placed on the base plate 7 in the position shown in Fig. 1, no part of the vacuum tube electrode comprising the two plates and their connecting wires comes in contact with the base.

Fig. 3 shows a completed unitary double plate electrode after the plates 22 and 36 have been secured together by welding the connecting wires thereto.

Fig. 4 shows the double plate electrode incorporated as the anode of a vacuum tube 38 of the three-electrode type.

It is to be understood that this invention is not limited to the particular form disclosed above and that it may be variously modified without departing in anywise from the spirit of this invention as defined in the appended claims.

What is claimed is:

1. A welding jig comprising a metallic block, a plurality of metallic arms hinged to said block, and means for clamping said arms against said block.

2. A welding jig comprising a metallic block, two metallic arms hinged to said block at one end thereof, and means for clamping said arms in close face-to-face relation with opposite sides of said block.

3. A welding jig comprising a metallic block having two extensive plane parallel surfaces on opposite sides thereof, two metallic arms hinged to said block at one end, each of said arms having an extensive plane surface, and means at the end opposite the hinged connection for clamping said arms against said block whereby the plane surfaces of said arms and said block are placed in close face-to-face relation with each other.

4. A welding jig comprising a metallic block, two metallic arms hinged to said block at one end thereof, means for clamping said arms in close face-to-face relation with opposite sides of said block, and a plurality of lugs near two edges of each of said arms, said lugs projecting beyond the sides of said arms adjacent said block, the distance between the lugs near one edge of one of said arms and the lugs near the other edge of said last mentioned arm being such that said block is inserted therebetween when said arms are clamped in place.

5. A jig for welding a two-part article, said jig comprising a metallic block, two arms hinged to said block, and means for clamping one part of said article between one of said arms and said block, and for clamping the other part of said article between the other arm and said block.

6. A jig for welding a two-part article, said jig comprising a metallic block, two metallic arms hinged to said block at one end thereof, said block having two extensive plane parallel surfaces on opposite sides thereof, each of said arms having a projecting flat surface, and means for clamping said arms against said block whereby the two parts of said article are held between the flat surfaces of said arms and said block.

7. A jig for welding an article which has two similar parts, said jig comprising a metallic block, two arms hinged to said block, said block having two extensive plane parallel surfaces on opposite sides thereof, each of said arms having an extensive flat surface, means for clamping one of said parts between one of said arms and said block and for clamping said other part between said other arm and said block, one dimension of the flat surface of said block and one dimension of the flat surface of said arm being substantially the same as a dimension of the two parts of said article, and means comprising lugs on said arms for preventing lateral motion of the two parts of said article.

8. A jig for an article of a plurality of parts and adapted to complete the electric circuit between welding electrodes, said jig comprising movable members for holding therebetween the parts of the article to be welded.

9. A jig for an article of a plurality of parts and adapted to complete the electric circuit between welding electrodes, said jig comprising a metallic block and movable members associated therewith for holding between said members and said block the parts of the article to be welded.

In witness whereof, I hereunto subscribe my name this 12th day of September A. D., 1919.

OTTO MULLER, Jr.